US010616985B2

(12) United States Patent
He et al.

(10) Patent No.: US 10,616,985 B2
(45) Date of Patent: Apr. 7, 2020

(54) SOLID STATE LIGHTING ASSEMBLY (71) Applicant: Dialog Semiconductor (UK) Limited, London (GB)

(72) Inventors: Kaiwen He, Shenzhen (CN); Horst Knoedgen, Munich (DE); Baorong Chen, Guandong (CN); Julian Tyrrell, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/672,054

(22) Filed: Nov. 1, 2019

(65) Prior Publication Data
US 2020/0068677 A1 Feb. 27, 2020

Related U.S. Application Data (60) Division of application No. 16/017,595, filed on Jun. 25, 2018, now Pat. No. 10,477,634, which is a
(Continued)

(51) Int. Cl.
*H05B 45/44* (2020.01)
*H05B 33/08* (2020.01)
(Continued)

(52) U.S. Cl.
CPC ......... *H05B 45/44* (2020.01); *H05B 33/0815* (2013.01); *H05B 45/00* (2020.01); *H05B 45/37* (2020.01); *Y02B 20/383* (2013.01)

(58) Field of Classification Search
CPC ............ H05B 33/0824; H05B 33/0815; H05B 33/0809; H05B 33/0803; Y02B 20/383
See application file for complete search history.

(56) References Cited

U.S. PATENT DOCUMENTS 8,890,429 B2 11/2014 Fukuda et al.
2012/0248986 A1 10/2012 Gibbs
(Continued)

FOREIGN PATENT DOCUMENTS

CA 2 726 157 6/2011
CN 202068609 12/2011
(Continued)

OTHER PUBLICATIONS

International Search Report, International Application No. PCT/CN2015/099242, Applicant: Dialog Semiconductor (UK) Ltd. ,dated Sep. 14, 2016, 3 pages.
(Continued)

*Primary Examiner* — Daniel D Chang
(74) *Attorney, Agent, or Firm* — Saile Ackerman LLC; Stephen B. Ackerman (57) ABSTRACT A solid state lighting SSL assembly comprises an SSL device, a capacitor, a directional conducting device and a supply switch. The capacitor is coupled in parallel with the SSL device. The directional conducting device is coupled between an output terminal of the capacitor and a supply terminal which provides a supply voltage for the SSL assembly. The directional conducting device is configured to conduct in a direction from the output terminal to the supply terminal and to isolate in the opposite direction. The supply switch is coupled between the output terminal and ground. In addition, a method for operating a solid state lighting SSL assembly is proposed.

8 Claims, 4 Drawing Sheets

Related U.S. Application Data continuation of application No. PCT/CN2015/099242, filed on Dec. 28, 2015.

(51) Int. Cl.
  *H05B 45/00* (2020.01)
  *H05B 45/37* (2020.01)

(56) References Cited

U.S. PATENT DOCUMENTS

| | | |
|---|---|---|
| 2015/0163882 A1 | 6/2015 | Zhang et al. |
| 2015/0173143 A1 | 6/2015 | Zhang et al. |
| 2016/0081151 A1* | 3/2016 | Wang ............... H05B 33/0818 315/186 |
| 2016/0150608 A1* | 5/2016 | Kuang ............... H05B 33/0815 315/206 |
| 2017/0142788 A1 | 5/2017 | Hu |

FOREIGN PATENT DOCUMENTS

| | | |
|---|---|---|
| CN | 202475854 | 10/2012 |
| CN | 202872323 | 4/2013 |
| CN | 103428970 | 12/2013 |
| CN | 203327287 | 12/2013 |
| CN | 103687190 | 3/2014 |
| CN | 105188183 | 12/2015 |
| WO | WO 2015/032422 | 3/2015 |

OTHER PUBLICATIONS

Chinese Office Action, Application No. 201580085413.7, Applicant: Dialog, dated Jun. 6, 2019, 8 pages, and English language translation, 14 pages.

* cited by examiner

SOLID STATE LIGHTING ASSEMBLY

This application is a Divisional application of U.S. application Ser. No. 16/017,595, filed on Jun. 25, 2018, which is a Continuation application of PCT application no. PCT/CN2015/099242, filed on Dec. 28, 2015, each of which is owned by a common assignee and is herein incorporated by reference in its entirety.

TECHNICAL FIELD

The present document relates to driver circuits for solid state lighting (SSL) devices.

BACKGROUND

Solid state lighting (SSL) light bulb assemblies, e.g. light emitting diode (LED) based light bulb assemblies, are currently replacing GLS (general lighting service) or incandescent lamps. SSL devices typically comprise a driver circuit and/or power converter in order to convert electric power from a mains supply to DC (direct current) electric power suitable for an SSL light source comprised within the SSL device (e.g. an array of LEDs).

An SSL assembly may comprise a plurality of SSL devices, e.g. for generating differently colored light or for generating white light from SSL devices which emit differently colored light. A driver circuit for such an SSL assembly typically comprises a plurality of power converters for driving the plurality of SSL devices, respectively. Alternatively, the electrical power produced by a power converter may be directed to the different SSL devices of the plurality of SSL devices using one or more switches.

In SSL assemblies, flickering of the SSL light source should be avoided. To improve the light quality, capacitors are used for stabilizing the energy supply to the SSL light sources. However, large capacitors typically increase the overall dimensions of the SSL assembly and may lead to a decreased lifetime. Specifically, large electrolytic capacitors tend to have high failure rates and may limit the lifetime of the entire SLL assembly. Thus, it is preferable that small capacitors such as e.g. ceramic or film capacitors are used instead of large electrolytic capacitors.

SUMMARY

The present document addresses the mentioned technical problems and provides small, cost and power efficient SSL assemblies which show a stable start-up behavior. A proposed solid state lighting SSL assembly comprises an SSL device, a capacitor, a directional conducting device and a supply switch. The capacitor is coupled in parallel with the SSL device. The directional conducting device is coupled between an output terminal of the capacitor and a supply terminal which provides a supply voltage for control portions of the SSL assembly. The directional conducting device is configured to conduct in a direction from the output terminal to the supply terminal and to isolate in the opposite direction. As will be discussed in the following paragraph, the term "conduct" refers to a situation in which the directional conducting device has a low electrical resistance in the respective direction. Similarly, the term "isolate" refers to a situation in which the directional conducting device has a high electrical resistance in the respective direction. The supply switch is coupled between the output terminal and ground.

The directional conducting device may be e.g. a diode. In this document, the directional conducting device is considered as an electronic component with at least two terminals that conducts primarily in one direction. That is, the diode has low resistance to the flow of current in a first direction, and high resistance in a second, opposite direction. An ideal diode would exhibit zero resistance in the first direction and infinite resistance in the second direction. As an example, a transistor operated as an active diode may as well serve as diode in the context of this document.

The SSL device may comprise a light source. In general, solid-state lighting refers to a type of lighting that uses e.g. semiconductor light-emitting diodes (LEDs), organic light-emitting diodes (OLED), or polymer light-emitting diodes (PLED) as sources of illumination. Preferably, the SSL device comprises a LED light source.

The supply terminal may provide the supply voltage for control portions (i.e. control circuitry) required for controlling the behavior of the SSL assembly. In particular, the control circuitry may control the supply switch, optional input switches for turning on or off a plurality of SSL devices, switching elements of possible power converters within the SSL assembly, or a controllable current source which may be coupled in series to the SSL device. For instance, the SSL assembly may comprise a supply capacitor coupled between the supply terminal and ground for stabilizing the supply voltage.

The supply switch may be implemented with any suitable device, such as, for example, a metal-oxide-semiconductor field effect transistor (MOSFET), an IGBT, a MOS-gated thyristor. The supply switch has a gate to which a respective driving voltage or control signal may be applied to turn the supply switch on or off.

The directional conducting device enables the charging of the supply terminal based on a current flowing through the SSL device when the supply switch is open and disables the discharging of the supply terminal to ground when the supply switch is closed. Specifically, by conducting in the direction from the output terminal of the capacitor to the supply terminal, a charging current may flow to the supply terminal when the supply switch is open. In this situation, the supply switch avoids a current flow through the SSL device to ground. Instead, when the supply switch is open, the current flowing through the SSL device is flowing to the supply terminal. During this time, the SSL device may start emitting light when the voltage across the capacitor is larger than a forward voltage (e.g. an LED forward voltage).

The supply switch may be configured to isolate the output terminal from ground in case the supply voltage for the SSL assembly is lower than a first threshold voltage. On the other hand, the supply switch may be configured to connect the output terminal to ground in case the supply voltage for the SSL assembly is higher than a second threshold voltage. For example, the first threshold voltage may be chosen to be equal to the second threshold voltage. The described arrangement of the supply switch and the directional conducting device redirects the current flow through the SSL device for efficient charging/powering of a VCC supply rail of the SSL assembly.

Moreover, the SSL assembly may comprise a power converter coupled between an input terminal of the SSL assembly and the SSL device. The power converter may be e.g. a buck converter comprising a first switching element coupled between the input terminal and an intermediate terminal, an inductor coupled between intermediate terminal and the SSL device, and a second switching element coupled between the intermediate terminal and ground. Alternatively, any other suitable power converter topologies for adjusting an input voltage and/or current to the characteristics of the SSL device may be used instead of the described buck converter.

The SSL assembly may comprise a controllable current source coupled in parallel with the capacitor. The controllable current source may be coupled in series with the SSL device, for example between the SSL device and the output terminal of the capacitor. In other words, both the SSL device and the controllable current source may be arranged in parallel to the capacitor. In this arrangement, the capacitor and the controllable current source act together as a charge source. Thus, a smaller capacitance value of the capacitor may be used for stabilizing the voltage at the SSL device. During zero crossing of an AC mains power supply applied to the input terminal of the SSL assembly, the current through the SSL device may be reduced but a light output should nevertheless be possible. Similarly, there may be valleys of the current resulting from the operation of a possible power converter (in particular of single stage switching power converters) at the input of the SSL assembly.

The SSL assembly may comprise a first protecting directional conductor coupled between the input terminal of the SSL assembly and the SSL devices, the first protecting directional conductor configured to conduct in a direction from the SSL device to the input terminal and to isolate in the opposite direction. The protecting directional conductor protects the circuit, in particular the SSL device, in case an over voltage occurs at an output terminal of the inductor. Such an over voltage may occur e.g. in situations when the supply switch is open for charging the supply terminal if the supply voltage is low.

Alternatively or additionally, the SSL assembly may comprise a shunt resistor coupled in series with the SSL device. Similar as the controllable current source, the shunt resistor may enable the application of a smaller value capacitor. Specifically, the shunt resistor may be coupled between the SSL device and ground.

Additionally, the SSL assembly may comprise several SSL devices, each of which having a capacitor coupled in parallel. Moreover, at the output terminals of the capacitors, respective directional conducting devices may couple the supply terminal with the capacitors for charging the supply terminal. A plurality of controllable current sources and/or shunt resistors may be coupled in parallel to each capacitor.

The SSL assembly may comprise one or more input switches coupled between the input terminal of the SSL assembly and the one or more SSL devices. The input switches are configured to, based on a control signal, connect the input terminal to the respective SSL devices or to disconnect the input terminal from the respective SSL devices. In this way, the individual SSL device may be turned on or off to e.g. for generating differently colored light.

In addition, the SSL assembly may comprise second protecting directional conductors coupled in series with the input switches, the second directional protecting conductors configured to conduct in a direction from the input terminal to the input switch and to isolate in the opposite direction.

According to another aspect, a solid state lighting SSL assembly comprising a main SSL device and a supplementary SSL device is proposed. The main SSL device is coupled between an input terminal of the SSL assembly and a main terminal. A main capacitor is coupled in parallel to the main SSL device between the input terminal and the main terminal. An inductor is coupled between the input terminal and an inductor terminal. A first switching element is coupled between the inductor terminal and a ground terminal. A main directional conducting device is coupled between the inductor terminal and the main terminal, wherein the main directional conducting device is configured to conduct in a direction from the inductor terminal to the main terminal and to isolate in the opposite direction. Further, a supplementary directional conducting device is coupled between the inductor terminal and a supplementary terminal, wherein the supplementary directional conducting device is configured to conduct in a direction from the inductor terminal to the supplementary terminal and to isolate in the opposite direction. The supplementary SSL device is coupled between the supplementary terminal and an input terminal of a second switching element. A supplementary capacitor is coupled in parallel to the supplementary SSL device between the supplementary terminal and the input terminal of the second switching element. The second switching element is coupled between said input terminal and the ground terminal.

Both the main SSL device and the supplementary SSL device may comprise e.g. one or more LEDs, OLEDs, or PLEDs as light sources. The main SSL device and the supplementary SSL device may be identical or different from each other. In particular, both SSL devices may exhibit different on-voltages, i.e. different voltages at which the respective light sources generate the desired amount and quality of light.

In the simplest case, the main directional conducting device and the supplementary directional conducting device may be implemented as diodes comprising e.g. a semiconductor device with a p-n junction. In general, however, any suitable circuit component may be used which conducts primarily in one direction.

The inductor and the first switching element form a buck-boost converter to regulate the voltages and currents through the main SSL device and the supplementary SSL device. For example, the buck-boost converter may be configured to regulate the respective currents in constant current mode. By controlling the switching behavior of the second switching element, the ratio of the current through the main SSL device to the current through the supplementary SSL device may be adjusted. At this, the main SSL device may emit e.g. white light whereas the supplementary SSL device emits light of a certain color (e.g. red light). Thus, the overall color of light emitted by the SSL assembly may be controlled by adjusting a switching frequency of the second switching element. Thus, it becomes possible to drive two SSL devices using a single (buck-boost) power converter.

The SSL assembly may comprise a third switching element, a forth switching element, a first directional conducting device and a second directional conducting device. The third switching element may be coupled between an output terminal of the first switching element and the ground terminal. The forth switching element may be coupled between an output terminal of the second switching element and the ground terminal. The first directional conducting device may be coupled between the output terminal of the first switching element and a supply terminal providing a supply voltage for the SSL assembly. Further, the first directional conducting device may be configured to conduct in a direction from the output terminal of the first switching element to the supply terminal and to isolate in the opposite direction. The second directional conducting device may be coupled between the output terminal of the second switching element and the supply terminal. Moreover, the second directional conducting device may be configured to conduct in a direction from the output terminal of the second switching element to the supply terminal and to isolate in the opposite direction. The SSL assembly may further comprise a supply capacitor coupled between the supply terminal and the ground terminal.

The third switching element may be configured to isolate the output terminal of the first switching element from the ground terminal in case the supply voltage for the SSL assembly is lower than a first threshold voltage. On the other hand, the third switching element may be configured to connect the output terminal of the first switching element to the ground terminal in case the supply voltage for the SSL assembly is higher than a second threshold voltage. For example, the first threshold voltage may be chosen to be equal to the second threshold voltage.

Similarly, the forth switching element may be configured to isolate the output terminal of the second switching element from the ground terminal in case the supply voltage for the SSL assembly is lower than a third threshold voltage. On the other hand, the forth switching element may be configured to connect the output terminal of the second switching element to the ground terminal in case the supply voltage for the SSL assembly is higher than a forth threshold voltage. For example, the third threshold voltage may be chosen to be equal to the forth threshold voltage.

In other words, the third and the forth switching elements may be opened to prevent the LED currents flowing to the ground terminal and instead use the latter LED currents for charging the supply voltage at the supply terminal.

According to a further aspect, a solid state lighting SSL assembly comprising an inductor, a first switching element, a main current path and a supplementary current path is proposed. The inductor and the first switching element establish a serial connection between an input terminal of the SSL assembly and a ground terminal, and the first switching element is configured to interrupt the serial connection. The main current path is coupled parallel to the inductor and comprises a main SSL device. The supplementary current path is coupled parallel to the first switching element and comprises a supplementary SSL device and a second switching element configured to interrupt the supplementary current path. For example, within the supplementary current path, the supplementary SSL device and the second switching element may be coupled in series.

The main current path may comprise a main capacitor coupled in parallel with the main SSL device, and the supplementary current path may comprise a supplementary capacitor coupled in parallel with the supplementary SSL device.

The main current path may comprise a main directional conducting device coupled in series with the main SSL device, wherein the main directional conducting device is configured to conduct in one direction and to isolate in the opposite direction. The supplementary current path may comprise a supplementary directional conducting device coupled in series with the supplementary SSL device, wherein the supplementary directional conducting device is configured to conduct in one direction and to isolate in the opposite direction.

Moreover, the main current path may couple the input terminal with an inductor terminal arranged between the inductor and the first switching element. The main directional conducting device may be configured to conduct in a direction from the inductor terminal to the input terminal and to isolate in the opposite direction. The supplementary current path may couple the inductor terminal with the ground terminal. The supplementary directional conducting device may be configured to conduct in a direction from the inductor terminal to the ground terminal and to isolate in the opposite direction.

Furthermore, the main SSL device may be coupled between the input terminal of the SSL assembly and a main terminal. The main capacitor may be coupled in parallel to the main SSL device between the input terminal and the main terminal. The inductor may be coupled between the input terminal and the inductor terminal. The first switching element may be coupled between the inductor terminal and the ground terminal. The main directional conducting device may be coupled between the inductor terminal and the main terminal, the main directional conducting device configured to conduct in a direction from the inductor terminal to the main terminal and to isolate in the opposite direction. The supplementary directional conducting device may be coupled between the inductor terminal and a supplementary terminal, the supplementary directional conducting device configured to conduct in a direction from the inductor terminal to the supplementary terminal and to isolate in the opposite direction. The supplementary SSL device may be coupled between the supplementary terminal and an input terminal of a second switching element. The supplementary capacitor may be coupled in parallel to the supplementary SSL device between the supplementary terminal and the input terminal of the second switching element. Finally, the second switching element may be coupled between its input terminal and the ground terminal.

The SSL assembly may comprise a third switching element, a forth switching element, a first directional conducting device and a second directional conducting device. The third switching element may be coupled between an output terminal of the first switching element and the ground terminal. The forth switching element may be coupled between an output terminal of the second switching element and the ground terminal. The first directional conducting device may be coupled between the output terminal of the first switching element and a supply terminal providing a supply voltage for the SSL assembly, the first directional conducting device configured to conduct in a direction from the output terminal of the first switching element to the supply terminal and to isolate in the opposite direction. The second directional conducting device may be coupled between the output terminal of the second switching element and the supply terminal, the second directional conducting device configured to conduct in a direction from the output terminal of the second switching element to the supply terminal and to isolate in the opposite direction.

In any case, the SSL assembly may comprise a supply capacitor coupled between the supply terminal and the ground terminal.

According to a further aspect, a method for operating a solid state lighting SSL assembly is proposed. The operated SSL assembly comprises an SSL device, a capacitor coupled in parallel with the SSL device, and a directional conducting device. The directional conducting device is coupled between an output terminal of the capacitor and a supply terminal providing a supply voltage for the SSL assembly. The directional conducting device is configured to conduct in a direction from the output terminal to the supply terminal and to isolate in the opposite direction. Finally, a supply switch is coupled between the output terminal and ground. The method comprises the step of isolating, by the supply switch, the output terminal from ground in case the supply voltage for the SSL assembly is lower than a first predetermined threshold voltage. Furthermore, the method may comprise the step of connecting, by the supply switch, the output terminal to ground in case the supply voltage for the SSL assembly is higher than a second predetermined threshold voltage.

It should be noted that the methods and apparatuses including its preferred embodiments as outlined in the present document may be used stand-alone or in combination with the other methods and apparatuses disclosed in this document. In addition, the features outlined in the context of an apparatus are also applicable to a corresponding method. Furthermore, all aspects of the methods and apparatuses outlined in the present document may be arbitrarily combined. In particular, the features of the claims may be combined with one another in an arbitrary manner.

In the present document, the terms "couple", "coupled", "connect", and "connected" refer to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
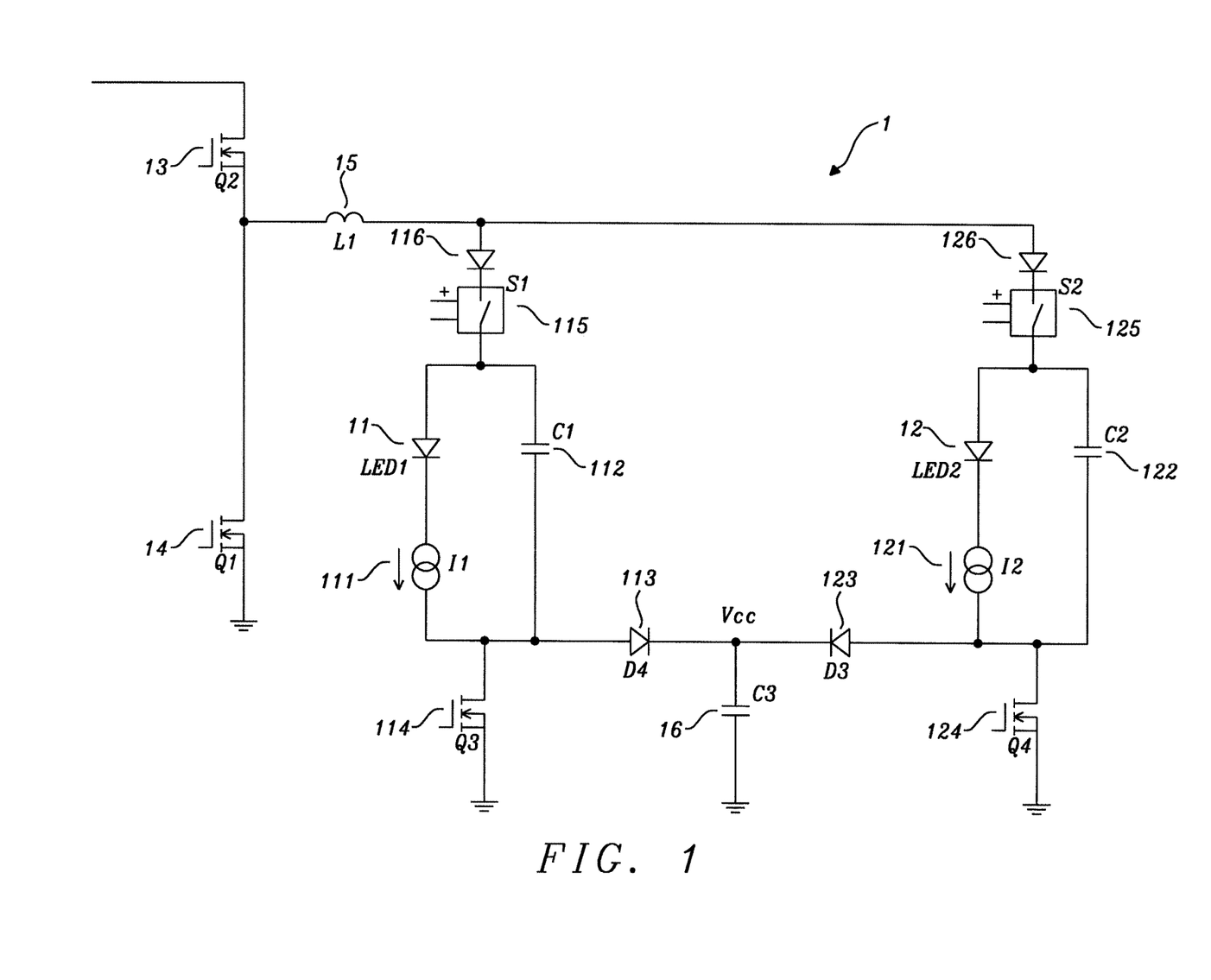
FIG. 1 illustrates an exemplary solid state lighting assembly.

FIG. 1 illustrates an exemplary solid state lighting SSL assembly 1 for driving two SSL devices. In the depicted example circuit, the two SSL devices are embodied by a first LED1 11 and a second LED2 12.

At the input of the SSL assembly 1, an exemplary buck converter is arranged, comprising two switching transistors 13, 14 and a coil 15. The first (high side) switching transistor 13 is coupled between an input terminal of the SSL assembly 1 and an intermediate node of the buck converter. The second (low side) switching transistor 14 is coupled between the intermediate node and ground. Coil 15 transfers converted electrical energy adapted to the characteristics of the LEDS to the first LED1 11 via a first input switch 115 and to the second LED2 12 via a second input switch 125. As will be described in the following, the first input switch 115 may transfer, when closed, the converted electrical energy to the first LED1 11 arranged within a first LED string. Analogously, the second input switch 125 may transfer, when closed, converted electrical energy to the second LED2 12 arranged within a second LED string.

In the first LED string, the anode terminal of the first LED1 11 is connected with the first input switch 115 and an input terminal of a first capacitor 112. The cathode terminal of the first LED1 11 is connected with an input terminal of a first controllable current source 111. The output terminal of the first controllable current source 111 is connected to the output terminal of the first capacitor 112, a first supply switch 114 and an anode terminal of a first diode 113. In other words, the first capacitor 112 is arranged in parallel to the first LED1 11 and the first controllable current source 111, which are in turn arranged in series to each other. In the depicted example, the first supply switch 114 is embodied as a transistor.

Analogously, the second LED2 12 is arranged within the second LED string. The anode terminal of the second LED2 12 is connected with the second input switch 125 and an input terminal of a second capacitor 122. The cathode terminal of the second LED2 12 is connected with an input terminal of a second controllable current source 121. The output terminal of the second controllable current source 121 is connected to the output terminal of the second capacitor 122, a second supply switch 124 and an anode terminal of a second diode 123. Put in a different way, the second capacitor 122 is also arranged in parallel to the second LED2 12 and the second controllable current source 121, which are in turn arranged in series to each other. In the depicted example, the second supply switch 124 is embodied as a transistor.

In the depicted example circuit, both the first supply switch 114 and the second supply switch 124 are connected to ground. Moreover, the cathode terminal of the first diode (directional conducting device) 113 and the cathode terminal of the second diode (directional conducting device) 123 are coupled to a supply terminal at the supply voltage Vcc. The supply voltage Vcc is used to power the control circuitry for controlling the circuit components of the SSL assembly 1. In FIG. 1, an optional supply capacitor 16 is depicted, which is coupled between the supply terminal and ground.

When the first input switch 115 is closed and the first supply switch 114 is open, an LED current may flow to the supply terminal via the first diode 113. As soon as the supply voltage at the supply terminal reaches a certain threshold level, the first supply switch 114 opens and the LED current is drawn to ground. Similar considerations hold for the second LED string. In particular, depending on which of the input switches 115, 125 is open, the supply terminal may be charged either via the first diode 113 or via the second diode 123.

By provisioning each LED string with controllable current sources 111, 121 in parallel to the capacitors 112, 122, the capacitance of the capacitors 112, 122 may be reduced since the capacitance of the capacitors 112, 122 is virtually increased by the additional charge carriers provided by the current sources 111, 121. As a further benefit of this SSL assembly 1, the illumination level of each LED may be regulated from 1% (or below) to 100% without modulating the LED of the other LED string. In addition, a voltage drop over the current source 111, 121 may be regulated to reduce losses.

Figure 2:
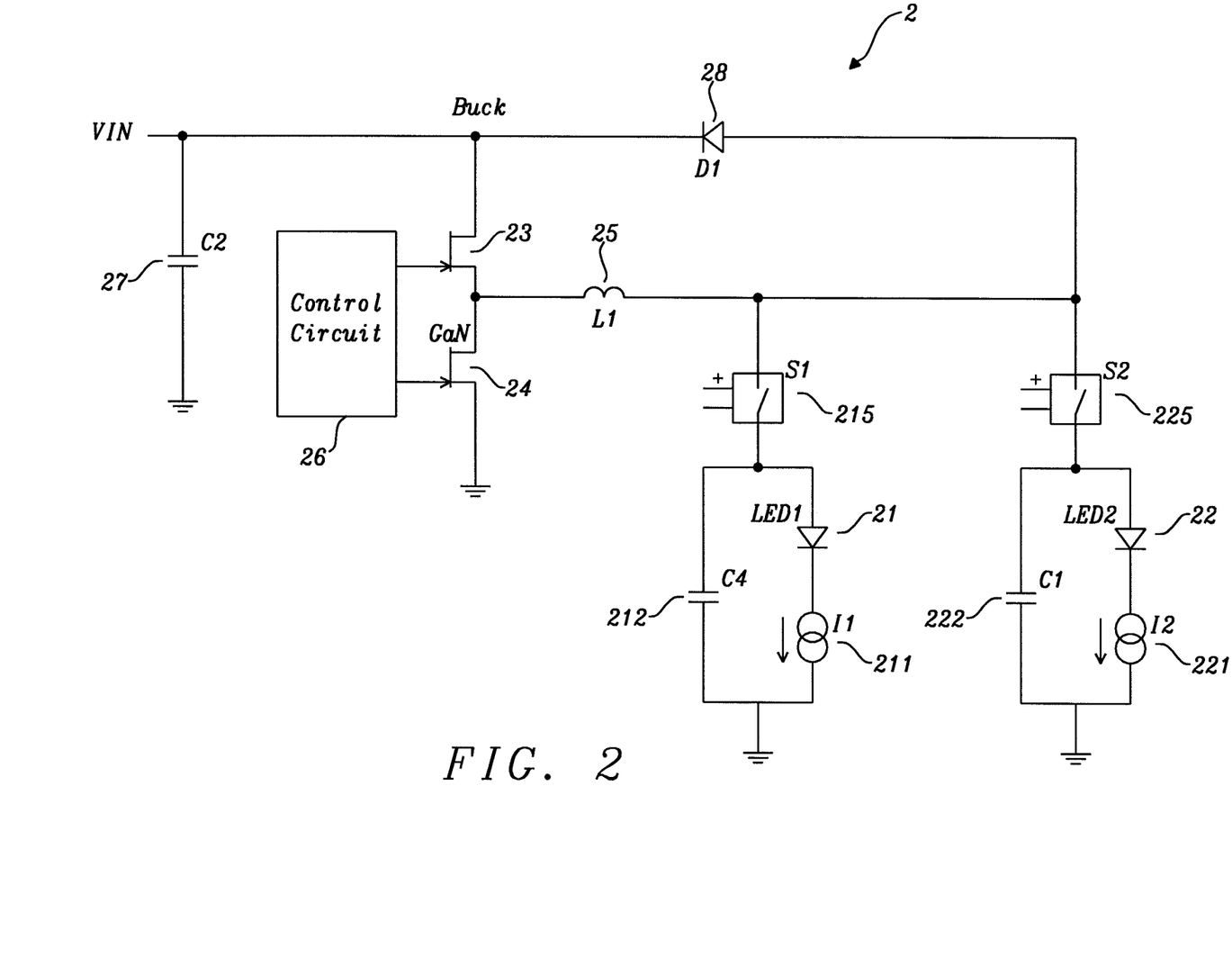
FIG. 2 illustrates another exemplary solid state lighting assembly.

FIG. 2 illustrates another exemplary solid state lighting assembly 2. With regard to FIG. 1, like reference numerals denote like circuit components. The SSL assembly 2 comprises two switching transistors 23, 24 that are driven by a control circuit 26, and a coil 25, forming a buck converter. Similar to the embodiment shown in FIG. 1, LEDS 21, 22 are arranged in parallel to capacitors 212, 222 and in series to controllable current sources 211, 221.

Exemplary SSL assembly 2 comprises an optional input capacitor 27 which is coupled between the input terminal of SSL assembly 2 and ground. Moreover, first and the second diodes 113, 123 for charging a supply terminal are not depicted in FIG. 2. Instead, FIG. 2 illustrates protection diode (protecting directional conductor) 28 coupled between the common terminal connecting both input switches 215, 225 and the input terminal of the SSL assembly 1. During times in which both input switches 215, 225 are open, the incoming current will be taken over by the protection diode 28 and the circuit is protected from an over voltage.

Figure 3:
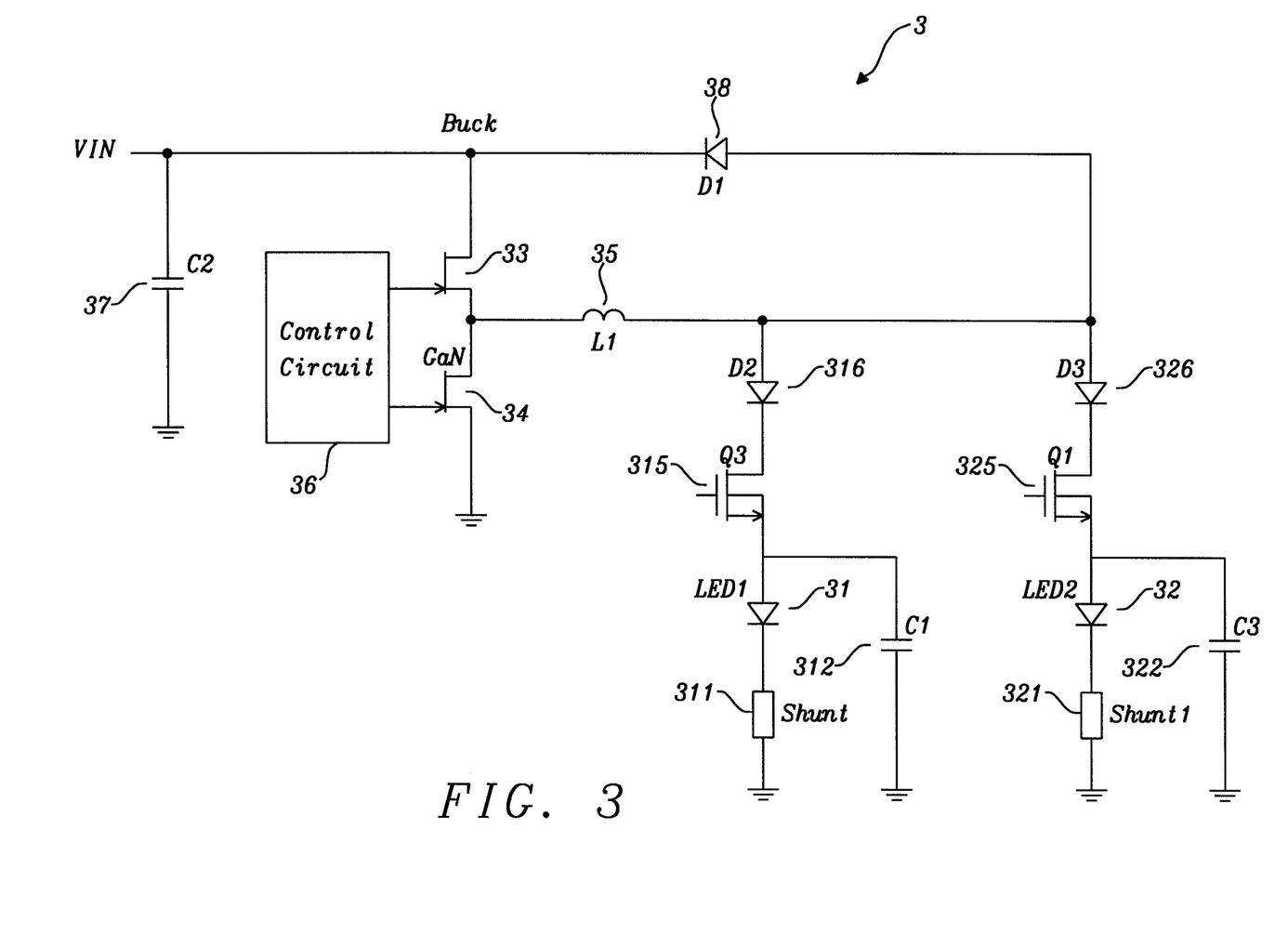
FIG. 3 illustrates yet another exemplary solid state lighting assembly.

FIG. 3 illustrates another exemplary solid state lighting assembly 3. With regard to FIG. 1 and FIG. 2, like reference numerals denote like circuit components. The SSL assembly 3 comprises two switching transistors 33, 34 that are driven by a control circuit 36, and a coil 35, forming a buck converter. Similar to the embodiment shown in FIG. 1, LEDS 31, 32 are arranged in parallel to capacitors 312, 322 and in series to controllable current sources 311, 321. An optional input capacitor 37 is coupled between the input terminal of SSL assembly 3 and ground. A protection diode (protecting directional conductor) 38 is coupled between the common terminal connecting diodes 316, 326 and inductor 35, and the input terminal of the SSL assembly 3.

Exemplary SSL assembly 3 differs from the previously discussed SSL assemblies 1, 2 in that input switch 315 is protected by protecting diode (protecting directional conductor) 316 and input switch 325 is protected by protecting diode (protecting directional conductor) 326. Moreover, SSL assembly 3 comprises shunt resistor 311 connected between the first LED 31 and ground and shunt resistor 321 connected between the second LED 32 and ground. Driven by the buck converter, the shunt resistors 311, 321 serve as current sources and enable a smaller dimensioning of the capacitors 312, 322.

Figure 4:
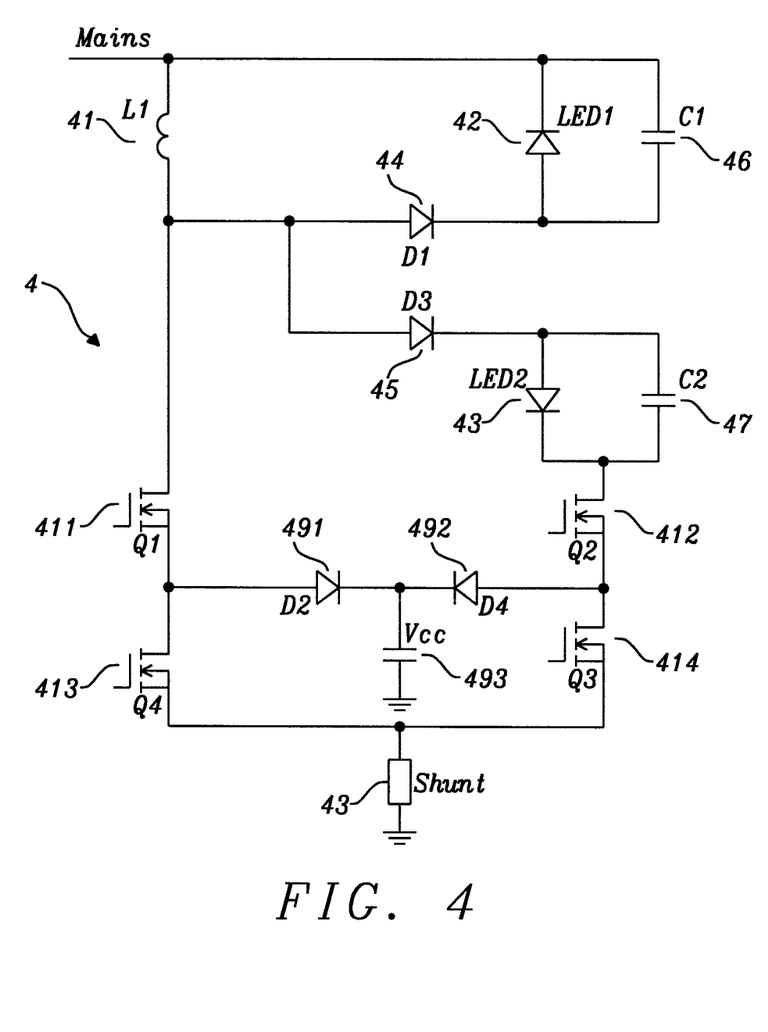
FIG. 4 illustrates a further exemplary solid state lighting assembly.

FIG. 4 illustrates another exemplary solid state lighting assembly 4. A main LED 42 is coupled between an input terminal of the SSL assembly 4 and a main terminal.

A main capacitor 46 is coupled in parallel to the main LED 42 between the input terminal and the main terminal. An inductor 41 is coupled between the input terminal and an inductor terminal. A first switching element 411 is coupled between the inductor terminal and a main supply terminal. A main diode 44 is coupled between the inductor terminal and the main terminal, and the main diode 44 is configured to conduct in a direction from the inductor terminal to the main terminal and to isolate in the opposite direction. A supplementary diode 45 is coupled between the inductor terminal and a supplementary terminal, wherein the supplementary diode 45 is configured to conduct in a direction from the inductor terminal to the supplementary terminal and to isolate in the opposite direction. A supplementary LED 43 is coupled between the supplementary terminal and an input terminal of a second switching element 412. A supplementary capacitor 47 is coupled in parallel to the supplementary LED 43 between the supplementary terminal and the input terminal of the second switching element 412. The second switching element 412 is coupled between its input terminal and a supplementary supply terminal. Moreover, SSL assembly 4 additionally comprises a third switching element 413, a forth switching element 414, a first diode 491 and a second diode 492. The third switching element 413 is coupled between the main supply terminal and an optional shunt resistor 48, which is coupled to ground. The forth switching element 414 is coupled between the supplementary supply terminal and the optional shunt resistor 48, which is coupled to ground. The first diode 491 is coupled between the main supply terminal and a supply terminal providing a supply voltage for the SSL assembly 4. The first diode 491 is configured to conduct in a direction from the main supply terminal to the supply terminal and to isolate in the opposite direction. The second diode 492 is coupled between the supplementary supply terminal and the supply terminal. The second diode 492 is configured to conduct in a direction from the supplementary supply terminal to the supply terminal and to isolate in the opposite direction. Finally, the SSL assembly 4 comprises a supply capacitor 493 coupled between the supply terminal and ground.

SSL assembly 4 enables controlling of the main LED 42 and the supplementary LED 43 at voltages regulated by the buck-boost converter, wherein the buck-boost converter is formed by the inductor 41, the first switching element 411 and the third switching element 413. Moreover, the ratio of the LED currents through the main LED 42 and the supplementary LED 43 is adjusted by controlled switching of the second switching element 412 and the forth switching element 414.

In addition, SSL assembly 4 allows re-usage of the LED currents to charge the supply voltage Vcc via the first diode 491 and the second diode 492 when the supply voltage Vcc is low. With the help of the third switching element 413 and the forth switching element 414, the respective LED currents may be redirected whenever the supply voltage Vcc is lower than a specific threshold value. This behavior is in particular advantageous to guarantee a well-controlled start-up of the SSL assembly 4.

It should be noted that the apparatus features described above correspond to respective method features that may however not be explicitly described, for reasons of conciseness. The disclosure of the present document is considered to extend also to such method features. In particular, the present disclosure is understood to relate to methods of operating the circuits described above.

It should further be noted that the description and drawings merely illustrate the principles of the proposed apparatus. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

What is claimed is:

1. A solid state lighting SSL assembly comprising
an inductor;
a first switching element, wherein the inductor and the first switching element establish a serial connection between an input terminal of the SSL assembly and a ground terminal, and the first switching element is configured to interrupt the serial connection;
a main current path parallel to the inductor, the main current path comprising a main SSL device; and
a supplementary current path parallel to the first switching element, the supplementary current path comprising a supplementary SSL device and a second switching element configured to interrupt the supplementary current path.

2. The SSL assembly according to claim 1, wherein the main current path comprises a main capacitor coupled in parallel with the main SSL device, and the supplementary current path comprises a supplementary capacitor coupled in parallel with the supplementary SSL device.

3. The SSL assembly according to claim 1, wherein
the main current path comprises a main directional conducting device coupled in series with the main SSL device, wherein the main directional conducting device is configured to conduct in one direction and to isolate in the opposite direction, and
the supplementary current path comprises a supplementary directional conducting device coupled in series with the supplementary SSL device, wherein the supplementary directional conducting device is configured to conduct in one direction and to isolate in the opposite direction.

4. The SSL assembly according to claim 3, wherein
the main current path couples the input terminal with an inductor terminal arranged between the inductor and the first switching element,
the main directional conducting device is configured to conduct in a direction from the inductor terminal to the input terminal and to isolate in the opposite direction,
the supplementary current path couples the inductor terminal with the ground terminal, and
the supplementary directional conducting device is configured to conduct in a direction from the inductor terminal to the ground terminal and to isolate in the opposite direction.

5. The SSL assembly according to claim 4, wherein
the main SSL device is coupled between the input terminal of the SSL assembly and a main terminal;
the main capacitor is coupled in parallel to the main SSL device between the input terminal and the main terminal;
the inductor is coupled between the input terminal and the inductor terminal;
the first switching element is coupled between the inductor terminal and the ground terminal;
the main directional conducting device is coupled between the inductor terminal and the main terminal, the main directional conducting device configured to conduct in a direction from the inductor terminal to the main terminal and to isolate in the opposite direction;
the supplementary directional conducting device is coupled between the inductor terminal and a supplementary terminal, the supplementary directional conducting device configured to conduct in a direction from the inductor terminal to the supplementary terminal and to isolate in the opposite direction;
the supplementary SSL device is coupled between the supplementary terminal and an input terminal of a second switching element;
the supplementary capacitor is coupled in parallel to the supplementary SSL device between the supplementary terminal and the input terminal of the second switching element; and
the second switching element is coupled between its input terminal and the ground terminal.

6. The SSL assembly according to claim 5, comprising a third switching element, a forth switching element, a first directional conducting device and a second directional conducting device, wherein
the third switching element is coupled between an output terminal of the first switching element and the ground terminal;
the forth switching element is coupled between an output terminal of the second switching element and the ground terminal;
the first directional conducting device is coupled between the output terminal of the first switching element and a supply terminal providing a supply voltage for the SSL assembly, the first directional conducting device configured to conduct in a direction from the output terminal of the first switching element to the supply terminal and to isolate in the opposite direction; and
the second directional conducting device is coupled between the output terminal of the second switching element and the supply terminal, the second directional conducting device configured to conduct in a direction from the output terminal of the second switching element to the supply terminal and to isolate in the opposite direction.

7. The SSL assembly according to claim 6, comprising a supply capacitor coupled between the supply terminal and the ground terminal.

8. A method for operating a solid state lighting SSL assembly, the assembly comprising an inductor; a first switching element, wherein the inductor and the first switching element establish a serial connection between an input terminal of the SSL assembly and a ground terminal; a main current path parallel to the inductor, the main current path comprising a main SSL device; and a supplementary current path parallel to the first switching element, the supplementary current path comprising a supplementary SSL device and a second switching element, the method comprising
interrupting, by the first switching element, the serial connection, and
interrupting, by the second switching element, the supplementary current path.

* * * * *